United States Patent [19]

Jenkins et al.

[11] 4,136,454
[45] Jan. 30, 1979

[54] APPARATUS FOR GAUGING THE THICKNESS OF MOVING LAMINAR MATERIAL

[75] Inventors: Stuart M. Jenkins, Bognor Regis; Albert K. King, Portsmouth; Raymond D. Reece, Gosport, all of England

[73] Assignee: De La Rue Instruments Limited, London, England

[21] Appl. No.: 686,903

[22] Filed: May 17, 1976

[51] Int. Cl.² .............................................. G01B 5/04
[52] U.S. Cl. ................................ 33/147 L; 33/148 H; 33/182
[58] Field of Search ............. 33/143 L, 143 R, 148 H, 33/172 E, 147 L, 147 N, 148 R, 182

[56] References Cited

U.S. PATENT DOCUMENTS

| | | | |
|---|---|---|---|
| 1,133,300 | 3/1915 | McGauley | 33/148 H |
| 2,073,365 | 3/1937 | Darlington | 33/148 R |
| 3,034,218 | 5/1962 | Robinson | 33/148 R |
| 3,817,068 | 6/1974 | Meyer | 33/182 |

Primary Examiner—Richard E. Aegerter
Assistant Examiner—Willis Little
Attorney, Agent, or Firm—Charles E. Brown

[57] ABSTRACT

Apparatus for gauging the thickness of moving laminar material comprising a gauging nip defined by a first roller of rigid material disposed on a fixed axis and a second roller biassed towards the first roller, the periphery of the second roller being rigid and adapted for movement away from the first roller, means for conveying the material through the nip and proximity detector means radially spaced from the periphery of the second roller and so positioned that the space formed therebetween is reduced upon the passage of material through the nip, the detector means being adapted to generate a material-thickness-indicative signal proportional to the displacement of the periphery of the second roller.

5 Claims, 1 Drawing Figure

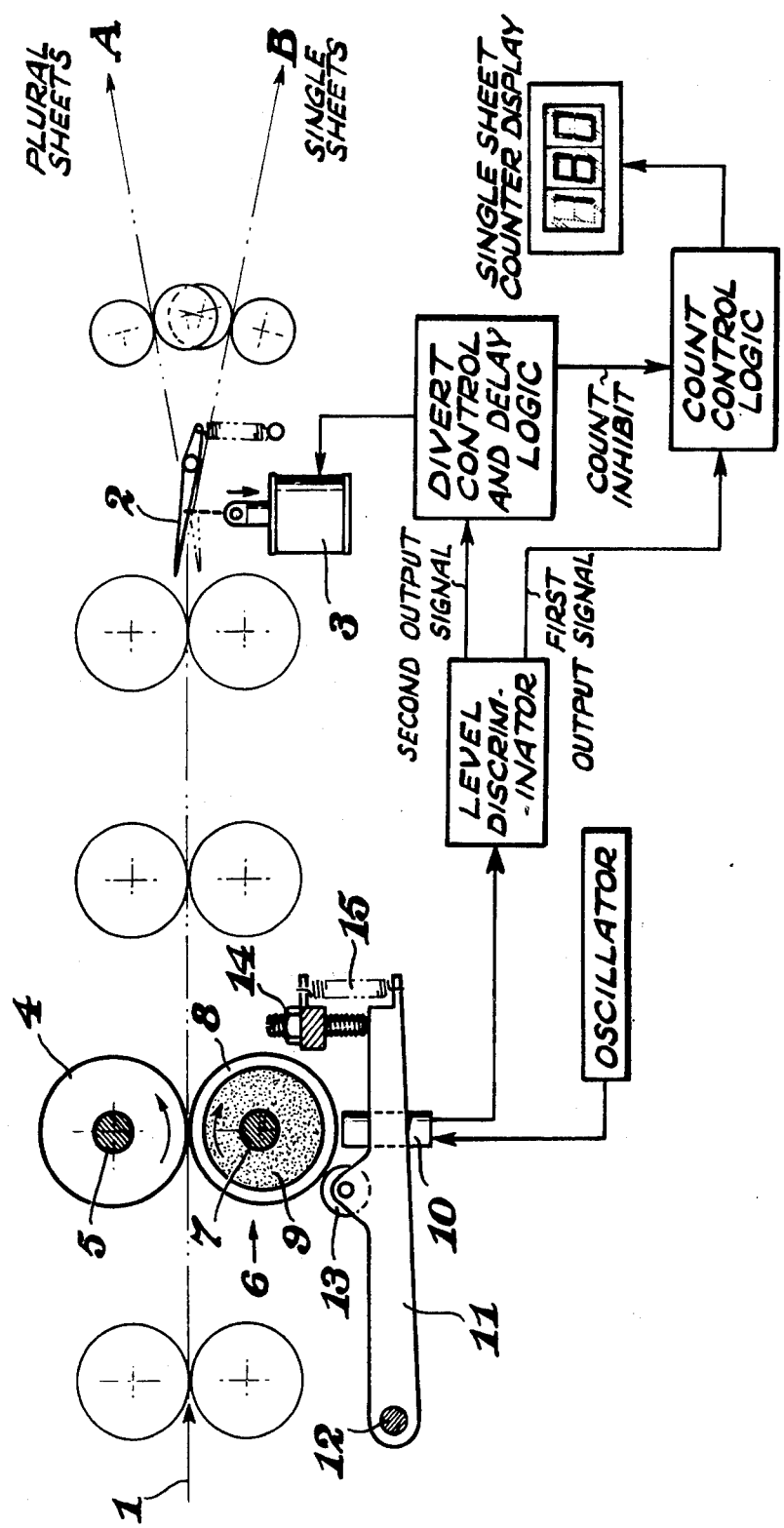

APPARATUS FOR GAUGING THE THICKNESS OF MOVING LAMINAR MATERIAL

This invention relates to an apparatus for gauging the thickness of laminar material moving along a flow-line.

More especially the invention relates to the gauging of sheets, for example, sheets of paper, which are fed seriatim along a flow-line in order to determine whether the sheets are single sheets or adhered together multiple sheets. Furthermore, the sheets may optionally be counted in accordance with signals created during the gauging, thereby to determine the quantities of either or both of the categories of sheets passing through the apparatus.

It is to be understood that the apparatus may also have utility in gauging strip material, for example, to detect the presence of an abnormal thickness of a moving web thereby to indicate faults in manufacture.

Referring specifically to the discrimination of single and multiple sheets of paper, considerable difficulties are entailed in providing a reliable gauge detection means capable of long periods of operation without adjustment. For example, the sheets may have a nominal thickness of 0.005" and accordingly, it is desirable that thickness in excess of say 0.008" are detected thereby to indicate the passage of plural sheets. Whilst the thickness of the sheets may fall within manufacturer's tolerances, circumstances may arise wherein a single sheet an upper limit may have a thickness only marginally less than a pair of adhered together sheets at a lower limit. It thus follows, that it is necessary for practical reasons to differentiate between small differences in gauge. A similar problem is encountered when it is desired to classify used sheets, for example, banknotes, wherein the degree of wear may promote variations in thickness.

Various mechanical means exist for detecting differences in gauge. One such arrangement comprises a pair of rollers mounted on parallel shafts and adapted to define therebetween a predetermined gap to permit the passage of single sheets. One of the shafts is mounted in a resilient manner so that the passage of plural sheets displaces the axis of the shaft thereby to actuate an electrical or mechanical switch means. The sensitivity of such a system may be increased by a suitable linkage thereby to amplify the displacement of the shaft but inevitably this creates further problems as a result of the necessary use of additional pivotal components which may be particularly prone to wear. Consequently, frequent adjustment is necessary to ensure reliability of the apparatus.

It is therefore the prime object of the present invention to provide an extremely simple and sensitive single and multiple sheet detection means which is not subject to the inconsistencies due to operational wear.

According to this invention apparatus for gauging the thickness of moving laminar material comprises a gauging nip defined by a first roller of rigid material disposed on a fixed axis and a second roller biassed towards the first roller, the periphery of the second roller being rigid and adapted for movement away from the first roller, means for conveying the material through the nip and proximity detector means radially spaced from the periphery of the second roller and so positioned that the space formed therebetween is reduced upon the passage of material through the nip, the detector means being adapted to generate a material-thickness-indicative signal proportional to the displacement of the periphery of the second roller.

Preferably the periphery of the said second roller comprises a ferrous material and the said sensing means comprises an electro-magnetic proximity transducer capable of producing an output voltage inversely proportional to its spacing from said periphery.

The said second roller may be wholly of rigid material and mounted upon a shaft having a yieldable axis, or in a more preferable form, it may comprise a metallic rim containing an elastic centre or hub portion which is mounted upon a shaft having a fixed axis. Conveniently, the said elastic portion comprises rubber or rubber-like material which is bonded or mechanically interlocked with said rim. For example, the rim may be provided with an internal annular groove which is adapted to receive the rubber portion.

The signal generated by the detector means may be used for a number of alternative purposes, for example, it may be fed into a threshold device so adapted to generate a warning signal to indicate the passage of material having an abnormal thickness. Optionally the said warning signal may be adapted to divert multiple or abnormal thickness sheets from the flow-line when the apparatus is intended to handle sheet material.

Alternatively, a dual-level discriminator may be provided to indicate the passage of single sheets, and plural sheets. In a practical arrangement a first level discriminator may be adapted to actuate a digital counter to totalise the single sheets and a second level discriminator to divert plural sheets from the flow-line and at the same time to inhibit the said counter.

A non-limiting example of the invention as applied to a sheet gauging and counting apparatus will now be described with reference to the accompanying drawing which depicts a diagrammatic side elevation of a gauging, conveying and classifying means together with associated electronic circuitry in block-diagram form. It should be realised that all frame members, bearings and driving means which are not critical to the understanding of the invention have been omitted.

Sheets are fed seriatim into a flow-line 1 by a feeding means, not shown, and are transported sequentially through the nips of driven pairs of rollers to either an output delivery A or an output delivery B, in a known manner. A pivotally mounted divertor 2, actuated by means of a solenoid 3, is provided to route the sheets to either A or B. The arrangement is such that when the solenoid is energised the divertor moves into the flow-line against the action of a spring thereby to route a sheet to delivery A.

Gauging of the sheets is effected by means of a driven nip formed by an upper wholly rigid roller 4, mounted upon a fixed-axis shaft 5, and an associated lower composite roller 6 mounted upon shaft 7. The roller 6, comprises a ferrous rim component 8 and a flexible centre or hub portion comprising a rubber disc 9 fixedly mounted to the shaft 7. The rim 8 is provided with an internal annular recess to permit the disc 9 to be forced into the interior of the same. The shaft 7 also has a fixed axis which is sited in such a manner that the peripheries of the upper and lower rollers are in contact with each other when no sheet is present in their nip. In this condition the rubber disc 9 is slightly stressed so that the periphery of the roller 6 is correspondingly slightly eccentric with respect to the axis centre of shaft 7. The purpose of this is to ensure that there is intimate contact between the rollers thereby to establish a datum for a detector means which is described below. In operation, the passage of sheets through the nip increases the eccentricity of the lower roller in accordance with the thickness of the sheet or sheets.

The detection device, indicated by symbol 10, comprises a magnetically conductive core surrounded by a tubular magnetically conductive core member which collectively form the core members of a transformer.

The device is sited in spaced relationship to the lower periphery of the rim 8 in such a manner that the axial centre of the core is disposed radially to the roller 6. In operation, the rim provides a magnetic coupling to the cores and when an alternating current is applied to the primary of the transformer a resulting output voltage from the secondary of the same is generated and this voltage is proportional to the air gap between the rim 8 and the end of the cores. Such a device is commercially available from Transducer Systems Inc., Willow Grove, Pennsylvania, U.S.A.

It will be appreciated that the coupling effect of the rim 8 is inversely proportional to the air gap and consequently the passage of sheet material through the nip will create a rise in output voltage in accordance with the thickness thereof. Using the exemplified apparatus to classify sheets having a nominal thickness of 0.005" the device was positioned with respect to the rim to provide a minimum air gap of 0.012", which created a datum output of 120 Mv RMS. The passage of a single sheet created a signal output of 400 Mv, and upon the passage of two superposed sheets the output increased to 1100 Mv.

To safeguard the apparatus against possible damage by the simultaneous passage of triple or more thicknesses, the detection device is mounted upon a lever 11 pivoted to the frame-work of the apparatus by a shaft 12. The lever is provided with a freely mounted roller 13 adjacent the device and spaced from the rim 8 by approximately 0.011", and is biassed against an adjustable stop screw 14 by means of a tension spring 15 in the manner shown. It will thus be seen that abnormal downward deflection of the rim 8 will contact the roller 13, and the device will be moved away from its static position without physical contact with the rim.

The means for controlling the divertor 3 and actuating a digital counter from signals generated by the detection device 10 may be of any suitable construction using well known circuitry and commercially available electronic components.

In the accompanying block-diagram an OSCILLATOR feeds a 5000 Hz alternating current at 3 volts RMS into the primary windings of the detection device 10. The magnetic coupling effect of the ferrous rim 8 induces an alternating current signal in the secondary windings which is fed into a LEVEL DISCRIMINATOR. The LEVEL DISCRIMINATOR includes a first threshold detector which is pre-set to produce a first TTL output signal when the signal from the detector device exceeds a voltage indicative of the passage of a single sheet, and a second threshold detector which is pre-set to produce a second TTL output signal when the signal from the detection device exceeds a voltage indicative of the simultaneous passage of plural sheets. Such threshold detectors may comprise, for example, type "3050 AC detectors" manufactured by INTECH.

The first output signal is fed into a COUNT CONTROL LOGIC module which includes a driver means to advance a single sheet counter and an associated DISPLAY device.

The second output signal is fed into a DIVERT CONTROL AND DELAY LOGIC module which includes three timing devices, viz (a) a first timer to cancel the second output signal if it terminates before the elapse of a period of 20 Milliseconds thereby to enable the apparatus to ignore the passage of a single sheet having a folded marginal edge; (b) a second timer to delay energisation of the solenoid 3 upon the receipt of a second signal thereby to ensure that a previously fed sheet has cleared the divertor 2, and (c) a third timer to delay the de-energisation of the solenoid 3 and hence delay the return of the divertor 2 after diversion of plural sheets.

In addition this module includes a driver transistor for the energisation of the solenoid 3 and a means to feed a COUNT INHIBIT pulse into the COUNT CONTROL LOGIC module upon actuation of the divertor 2.

In operation every single sheet fed through the gauging nip deflects the rim 8 and the LEVEL DISCRIMINATOR creates a FIRST OUTPUT signal which advances the counter display via the COUNT CONTROL LOGIC module and the sheet is fed to destination B. The simultaneous passage of plural sheets through the gauging nip deflects the rim 8 through a greater distance and the LEVEL DISCRIMINATOR creates FIRST and SECOND OUTPUT signals, the latter of which inhibits the FIRST OUTPUT signal and actuates the divertor 2 thereby to feed the plural sheets to destination A.

It will thus be appreciated that by means of the invention, roller nip sheet thickness gauging may be effected without the need for critically adjusted caliper or like devices and the disadvantages and maintenance problems associated therewith have been eliminated. Furthermore, in the exemplified embodiment of the invention the shafts carrying the nip rollers are disposed on fixed axes and consequently, bearings and driving means for the same may be of simple construction.

We claim:

1. Apparatus for recognizing the passage of single sheets and superposed such sheets fed along a flow-line, said apparatus comprising a first roller of rigid material disposed on a first shaft having a fixed axis, a second roller having a rigid ferrous sheet contacting periphery disposed on a second shaft, said first and second rollers defining a nip therebetween, means biasing said second roller periphery toward said first roller so as normally to make rolling contact therewith while being capable of moving away therefrom by the passage of a sheet or sheets through said nip, means for conveying sheets through said nip, an electromagnetic transducer disposed in radially spaced relationship to the ferrous sheet contacting periphery of said second roller and remotely located from said nip, the relative positions of said transducer and said second roller being such that the spacing of said transducer from said second roller reduces and a magnetic coupling effect derived from said ferrous sheet contacting periphery increases proportionally upon the passage of a sheet through said nip, first and second threshold devices, means responsive to movement of said second roller for preventing contact between said transducer and said second roller, and electronic circuit means including a level discriminator coupled with said transducer for detecting the level of current in said transducer as influenced by the position of said ferrous periphery and selectively generating a single-sheet indicative output signal and plural-sheet indicative output signal in accordance with the position of said ferrous periphery.

2. Apparatus for recognizing the passage of single sheets and superposed such sheets fed along a flow-line, said apparatus comprising a first roller of rigid material disposed on a first shaft having a fixed axis, a second roller having a rigid ferrous sheet contacting periphery disposed on a second shaft, said first and second rollers defining a nip therebetween, means biasing said second roller periphery towards said first roller so as normally to make rolling contact therewith while being capable of moving away therefrom by the passage of a sheet or sheets through said nip, means for conveying sheets through said nip, and electromagnetic transducer disposed in radially spaced relationship to the ferrous sheet contacting periphery of said second roller, the relative positions of said transducer and said second roller being such that the spacing of said transducer from said second roller reduces and a magnetic coupling effect derived from said ferrous sheet contacting periphery increases proportionally upon the passage of a sheet through said nip, first and second threshold devices, electronic circuit means including a level discriminator coupled with said transducer for detecting the level of current in said transducer as influenced by the position of said ferrous periphery and selectively generating a single-sheet indicative output signal and a plural-sheet indicative output signal in accordance with the position of said ferrous periphery, said second shaft having a fixed axis, the periphery of the second roller is the external surface of a ferrous ring, and said second roller has an elastic hub portion mounting said ferrous ring on said second shaft, thereby to permit the periphery of said second roller to rotate eccentrically upon said second shaft.

3. Apparatus as claimed in claim 1 in which said elastic hub portion is formed of rubber or a rubberlike material.

4. Apparatus as claimed in claim 3 in which said elastic hub portion is mechanically interlocked within said ferrous ring.

5. Apparatus as claimed in claim 3 in which said elastic hub portion is bonded to the interior of said ferrous ring.

* * * * *